July 31, 1928. 1,679,233
L. STRAUSS
ATTACHMENT FOR OPHTHALMIC MOUNTINGS
Filed Feb. 24, 1927
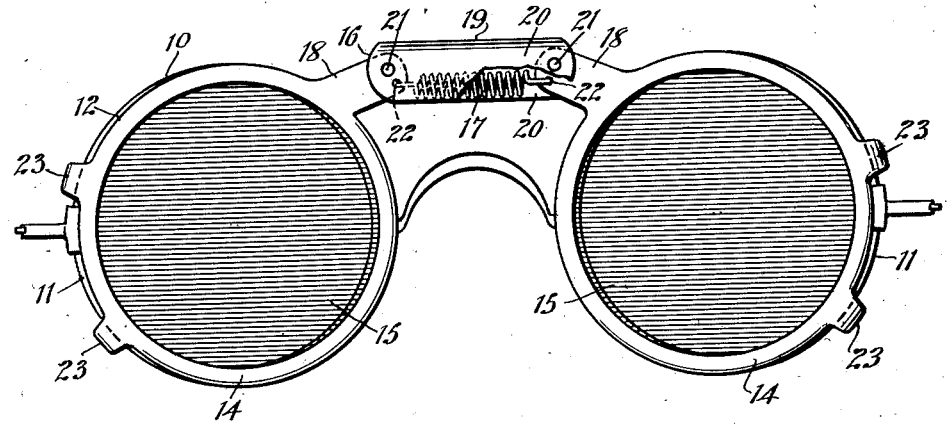
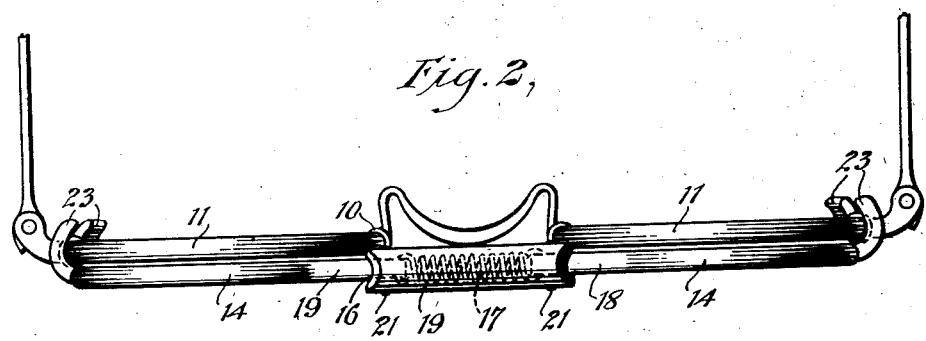
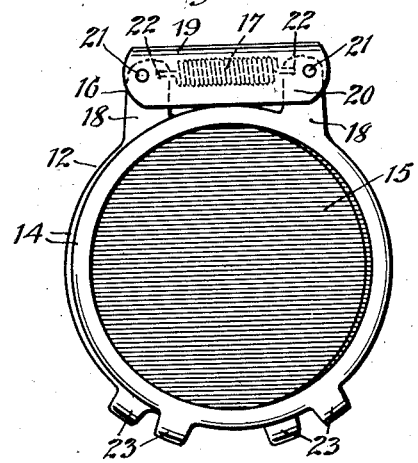
WITNESSES
Edw. Thorpe
Chris Feinle
INVENTOR
Leo Strauss
BY Munn & Co.
ATTORNEY Patented July 31, 1928.

1,679,233

UNITED STATES PATENT OFFICE.

LEO STRAUSS, OF FAR ROCKAWAY, NEW YORK.

ATTACHMENT FOR OPHTHALMIC MOUNTINGS.

Application filed February 24, 1927. Serial No. 170,589.

This invention relates to ophthalmic devices, and has especial reference to ophthalmic devices adapted to be used advantageously in conjunction with other analogous devices such as spectacles and the like.

The principal object of the present invention is the provision of an improved attachment for primary ophthalmic devices, to provide detachable supplemental lenses therefor, for the purpose of diffusing glaring rays of light, so that the vision will not be affected.

Another object of the invention is the provision of an ophthalmic device in the form of goggles having an improved bridge between the lens frames.

Another object of the invention is to provide goggles with a novel connecting means between the lens frames thereof, so that the goggles when not in use may be folded, or in other words, to permit the lens frames to be brought together side by side, also to permit the lens frames to be juxtaposed with respect to each other in the same plane ready for use.

The nature of the invention and its distinguishing features and advantages will appear when the following specification is read in connection with the accompanying drawing, in which—

Figure 1 is a view illustrating the attachment of the present invention in place on primary eyeglasses, a portion of the bridge member being broken away.

Fig. 2 is a top edge view of the attachment associated with the eyeglasses.

Fig. 3 is an elevation of the attachment in a folded condition.

The present invention contemplates the provision of an attachment in the form of goggles capable of being detachably connected with a primary ophthalmic mounting, to provide a pair of supplemental colored lenses for the purpose of preventing glaring rays of light from affecting the vision of persons who have to wear these ophthalmic mountings in order to correct impaired vision. The invention resides principally in the connecting means between a pair of frames which carry the colored lenses or glasses. The connecting means may be employed in conjunction with lens frames particularly adapted for connection with the frames of other ophthalmic mountings or with ordinary lens frames.

Referring now more particularly to the drawings, it will be apparent that there has been shown an ophthalmic mounting 10 of the usual construction including lens rims or frames 11 in which are mounted the usual transparent lenses or glasses for connecting the vision of a person. There is also shown an ophthalmic device in the form of an attachment 12 capable of being detachably connected with the mounting 10. The attachment 12 comprises a pair of rims or frames 14 in each of which is mounted a colored lens or glass 15, means 16 is connected between the top edges of the frames 14 permitting the frames 14 to be moved relatively to each other, and means 17 for placing the frames under tension. The frames 14 will be similar in shape and construction, and may be of any shape, although they are circular in the present instance. Each frame may also be made of any preferred material such as metal or celluloid. The means 16 hereinbefore mentioned consists of an extension 18 on each of the frames 14 and a bridge member 19. The bridge member 19 is U-shaped in cross section, to provide spaced portions 20 which are adapted to be flexed slightly with respect to each other. The opposite ends of the bridge member 19 are respectively pivotally connected with the extensions 18, and this is accomplished by inserting the extensions 18 between the portions 20, and by employing pivots 21 which extend through the portions 20 and the extensions 18. This provision permits the lens frames 14 to be moved with respect to each other, either to be brought together to be disposed side by side, as shown in Fig. 3, or to be juxtaposed with respect to each other edge to edge in substantially the same plane, as shown in Figs. 1 and 2. The means 17 hereinbefore referred to is in the form of a contractile spring whose opposite ends respectively are connected with the extensions 18, as at 22, to one side of their points of pivotal connection with the bridge member 19. The spring 17 has a normal tendency to pull the lens frames 14 toward each other to the side by side relationship, and allows the said lens frames 14 to be moved to the edge to edge relationship, in which they will be under the influence of the spring 17 tending to draw them together.

In order to effect the detachable connection of the lens frames 14 with the frames 11 of the mounting 10, each of the frames 14 is provided with hooks 23 arranged in spaced relationship. The hooks may be incorporated in any preferred manner, they may be secured to the frames 14 or may be formed integral therewith as in the present instance. When the frames 14 are in the edge to edge relationship, the hooks 23 may be engaged or hooked over the related frames 11 of the mounting 10, the spring 17 serving to tension the frames 14 and thus detachably hold them in place.

From the foregoing it will be evident that the attachment serves for providing supplemental colored lenses in conjunction with the transparent lenses of the primary eyeglasses or ophthalmic mounting 10 to constitute an anti-glare ophthalmic device; and that such device may be readily put into use, and when not in use may be folded to a small compass to be readily carried about.

It is to be understood that the invention is not restricted to the precise arrangement of parts shown and described, as details of construction may be modified and rearranged without departing from the spirit of the invention, the scope of which is limited only by the terms of the appended claims.

I claim:

1. An ophthalmic device comprising a pair of lens frames, a bridge member, means connecting the bridge member with said lens frames so as to permit the frames to be moved with respect to each other to be juxtaposed side by side, or edge to edge in the same plane, and means connected with the frames and having a normal tendency to urge the frames to the side by side relationship.

2. An ophthalmic device comprising a pair of lens frames, a rigid bridge member, means connecting the bridge member with said lens frames so as to permit the frames to be moved with respect to each other to be juxtaposed side by side, or edge to edge in the same plane, and means connected with the frames and having a normal tendency to urge the frames to the side by side relationship.

3. An ophthalmic device comprising a pair of lens frames, a bridge member, means connecting the bridge member with said lens frames so as to permit the frames to be moved with respect to each other to be juxtaposed side by side, or edge to edge in the same plane, and a contractile spring connected with the frames and having a normal tendency to urge the frames to the side by side relationship.

4. An ophthalmic attachment including a pair of lens frames, a bridge having the opposite ends respectively pivotally connected with said frames, and tension means having the opposite ends thereof respectively connected with said frames, said tension means acting on said frames to put the frames under tension when they are juxtaposed edge to edge in substantially the same plane.

5. An ophthalmic attachment including a pair of lens frames, each of said frames having an extension, a bridge member having the opposite ends respectively pivotally connected with the extensions on said frames, and tension means having the opposite ends respectively connected with said extensions between their points of pivotal connection and the frames.

6. An ophthalmic attachment comprising a pair of lens frames, a bridge member, means connecting the bridge member with said lenses frames so as to permit the frames to be moved with respect to each other to be juxtaposed side by side, or edge to edge in the same plane, means connected with the frames and having a normal tendency to urge the frames to the side by side relationship, and attaching means on each of said lens frames.

LEO STRAUSS.